(12) United States Patent
Cai et al.

(10) Patent No.: US 10,860,623 B2
(45) Date of Patent: Dec. 8, 2020

(54) PICTURE DYNAMIC DISPLAY METHOD, ELECTRONIC EQUIPMENT AND STORAGE MEDIUM

(71) Applicant: Tencent Technology (Shenzhen) Company Limited, Shenzhen (CN)

(72) Inventors: Shuxiong Cai, Shenzhen (CN); Zihong Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/102,515

(22) Filed: Aug. 13, 2018

(65) Prior Publication Data

US 2019/0042598 A1    Feb. 7, 2019

Related U.S. Application Data

(63) Continuation of application No. PCT/CN2017/085514, filed on May 23, 2017.

(30) Foreign Application Priority Data

May 24, 2016   (CN) .......................... 2016 1 0349904

(51) Int. Cl.
*G06F 16/29*   (2019.01)
*G06F 16/54*   (2019.01)
(Continued)

(52) U.S. Cl.
CPC .............. *G06F 16/29* (2019.01); *G06F 9/451* (2018.02); *G06F 16/434* (2019.01); *G06F 16/54* (2019.01); *G06F 16/739* (2019.01); *G06T 13/00* (2013.01)

(58) Field of Classification Search
CPC ........ G06F 16/29; G06F 9/451; G06F 16/434; G06F 16/739; G06F 16/00; G06F 16/54; G06F 16/51; G06T 13/00
See application file for complete search history.

(56) References Cited

U.S. PATENT DOCUMENTS

| 2008/0159708 | A1* | 7/2008 | Kazama | .................. H04N 5/91 386/333 |
| 2011/0096076 | A1* | 4/2011 | Kwiatkowski | .......... G06T 13/00 345/473 |
| 2014/0267303 | A1* | 9/2014 | Larkin | .................... G06T 13/80 345/473 |

FOREIGN PATENT DOCUMENTS

| CN | 104699382 A | * | 6/2015 | ............. G06F 17/30 |
| CN | 104699382 A | | 6/2015 | |

(Continued)

OTHER PUBLICATIONS

Tencent Technology, ISRWO, PCT/CN2017/085514, dated Aug. 24, 2017, 7 pgs.

(Continued)

*Primary Examiner* — Maurice L. McDowell, Jr.
*Assistant Examiner* — Donna J. Ricks
(74) *Attorney, Agent, or Firm* — Morgan, Lewis & Bockius LLP

(57) ABSTRACT

The present disclosure relates to a picture dynamic display method performed at a computing device. After acquiring a plurality of pictures, the computing device determines a display sequence of the acquired pictures. For each acquired picture, the computing device determines a corresponding local trajectory within a complete trajectory according to the display sequence. The computing device then draws corresponding local trajectories in turn according to the display sequence and displays a corresponding acquired picture in a display region corresponding to each drawn local trajectory.

(Continued)

The acquired picture is continuously drawn according to a corresponding transitional trajectory in the complete trajectory while the local trajectory transits to a subsequent local trajectory according to the display sequence.

18 Claims, 10 Drawing Sheets

(51) Int. Cl.
*G06T 13/00* (2011.01)
*G06F 9/451* (2018.01)
*G06F 16/432* (2019.01)
*G06F 16/738* (2019.01)

(56) References Cited

FOREIGN PATENT DOCUMENTS

| | | |
|---|---|---|
| CN | 104809203 A | 7/2015 |
| CN | 105117455 A | 12/2015 |
| CN | 105320689 A | 2/2016 |
| CN | 106021519 A | 10/2016 |
| JP | 2007226761 A * | 9/2007 ............... A63B 9/00 |

OTHER PUBLICATIONS

Tencent Technology, IPRP, PCT/CN2017/085514, dated Nov. 27, 2018, 6 pgs.

* cited by examiner

US 10,860,623 B2

PICTURE DYNAMIC DISPLAY METHOD, ELECTRONIC EQUIPMENT AND STORAGE MEDIUM

PRIORITY CLAIM AND RELATED APPLICATION

This application is a continuation application of PCT/CN2017/085514, entitled "METHOD FOR DYNAMICALLY DISPLAYING PICTURES, ELECTRONIC DEVICE AND STORAGE MEDIUM" filed on May 23, 2017, which claims priority to Chinese Patent Application No. 201610349904.4, filed with the State Intellectual Property Office of the People's Republic of China on May 24, 2016, and entitled "PICTURE DYNAMIC DISPLAY METHOD AND DEVICE", all of which are incorporated herein by reference in their entirety.

FIELD OF THE TECHNOLOGY

This application relates to the technical field of information processing, and particularly relates to a picture dynamic display device, electronic equipment and a storage medium.

BACKGROUND OF THE DISCLOSURE

A picture is data capable of carrying visual information, and the visual information can be restored by displaying the picture. As a common information carrier, a picture can record events occurring in the real world, and can also express the emotion, etc., of an author of the picture, and by displaying the picture, contents of the historical events can be re-presented, or the emotion, etc. of the author of the picture can be conveyed.

Currently, pictures are mainly displayed according to user operation, for example, when a thumbnail of a series of pictures is displayed, pictures corresponding to the clicked thumbnail are displayed after the thumbnail clicked by the user is detected. However, existing manners for displaying pictures based on user operation depends on user operation, the operation is complicated, and therefore, the efficiency of conveying information via the pictures is low.

SUMMARY

According to various embodiments of this application, a picture dynamic display method, electronic equipment and a storage medium are provided.

According to a first aspect of the present disclosure, a picture dynamic display method is performed at a computing device having one or more processors and memory storing a plurality of programs to be executed by the one or more processors. After acquiring a plurality of pictures, the computing device determines a display sequence of the acquired pictures. For each acquired picture, the computing device determines a corresponding local trajectory within a complete trajectory according to the display sequence. The computing device then draws corresponding local trajectories in turn according to the display sequence and displays a corresponding acquired picture in a display region corresponding to each drawn local trajectory. The acquired picture is continuously drawn according to a corresponding transitional trajectory in the complete trajectory while the local trajectory transits to a subsequent local trajectory according to the display sequence.

According to a second aspect of the present disclosure, a computing device has one or more processors, memory coupled to the one or more processors, and a plurality of programs stored in the memory that, when executed by the one or more processors, cause the computing device to perform the aforementioned picture dynamic display method.

According to a third aspect of the present disclosure, a non-transitory computer readable storage medium stores a plurality of programs in connection with a computing device having one or more processors. The plurality of programs, when executed by the one or more processors, cause the computing device to perform the aforementioned picture dynamic display method.

One or more embodiments of this application will be proposed in the following drawings and description. Other features, objectives and advantages of this application will become manifest in the specification, the drawings and the claims.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

DESCRIPTION OF EMBODIMENTS

In order to illustrate the aims, technical schemes and advantages of this application, further detailed description will be made for this application with reference to the accompanying drawings and embodiments. It should be understood that the detailed embodiments described here are only used for explaining this application and are not intended to limit this application.

Figure 1:
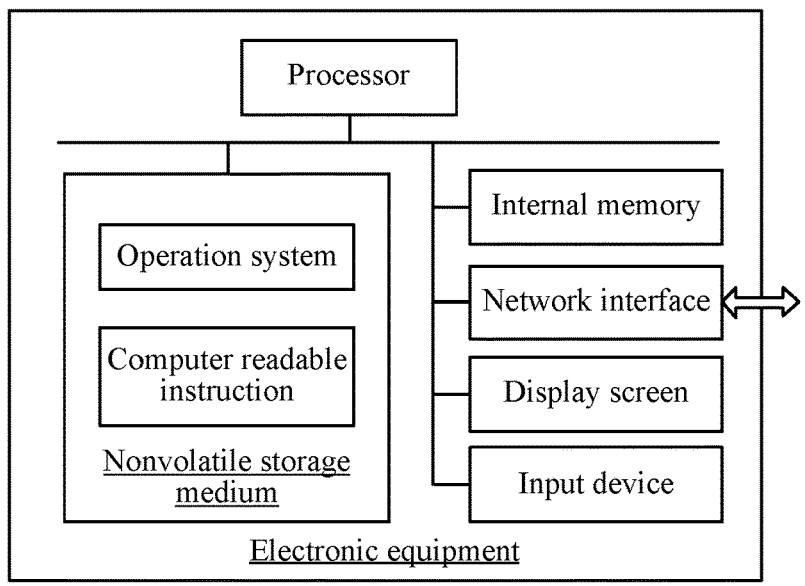
FIG. 1 is an internal structure diagram of electronic equipment in one embodiment.

As shown in FIG. 1, in one embodiment, electronic equipment is provided, including a processor, a nonvolatile storage medium, an internal memory, a network interface, a display screen and an input device which are connected by a system bus. The nonvolatile storage medium of the electronic equipment stores an operation system, and can also store a computer readable instruction, and when the computer readable instruction is executed by the processor, the processor may be enabled to realize a picture dynamic display method. The processor is configured to provide computing and control capacity so as to support the operation of the whole electronic equipment. The internal memory in the electronic equipment can store the computer readable instruction, and when the computer readable instruction is executed by the processor, the processor may be enabled to a picture dynamic display method. The network interface is configured to connect to a network for communication, for example, acquiring scripts used for computing trajectories, drawing trajectories and display pictures from a server. The display screen of the electronic equipment can be a liquid crystal display, or an electronic ink display, or the like, and the input device can be a touch layer covering on the display screen, can also be a key, a trajectory ball or a touchpad arranged on a housing of the electronic equipment, and can further by external keyboard, touchpad or mouse. The electronic equipment can be a mobile phone, a tablet computer or a personal digital assistant, or wearable equipment, or the like. It can be understood by a person skilled in the art that a structure shown in FIG. 1 is only a block diagram of a partial structure related to the scheme of this application, and does not constitute a limitation to the electronic equipment applying the scheme of this application, and the specific electronic equipment can include more components or fewer components than those shown in the figure, or some components can be combined, or a different component deployment can be used.

Figure 2:
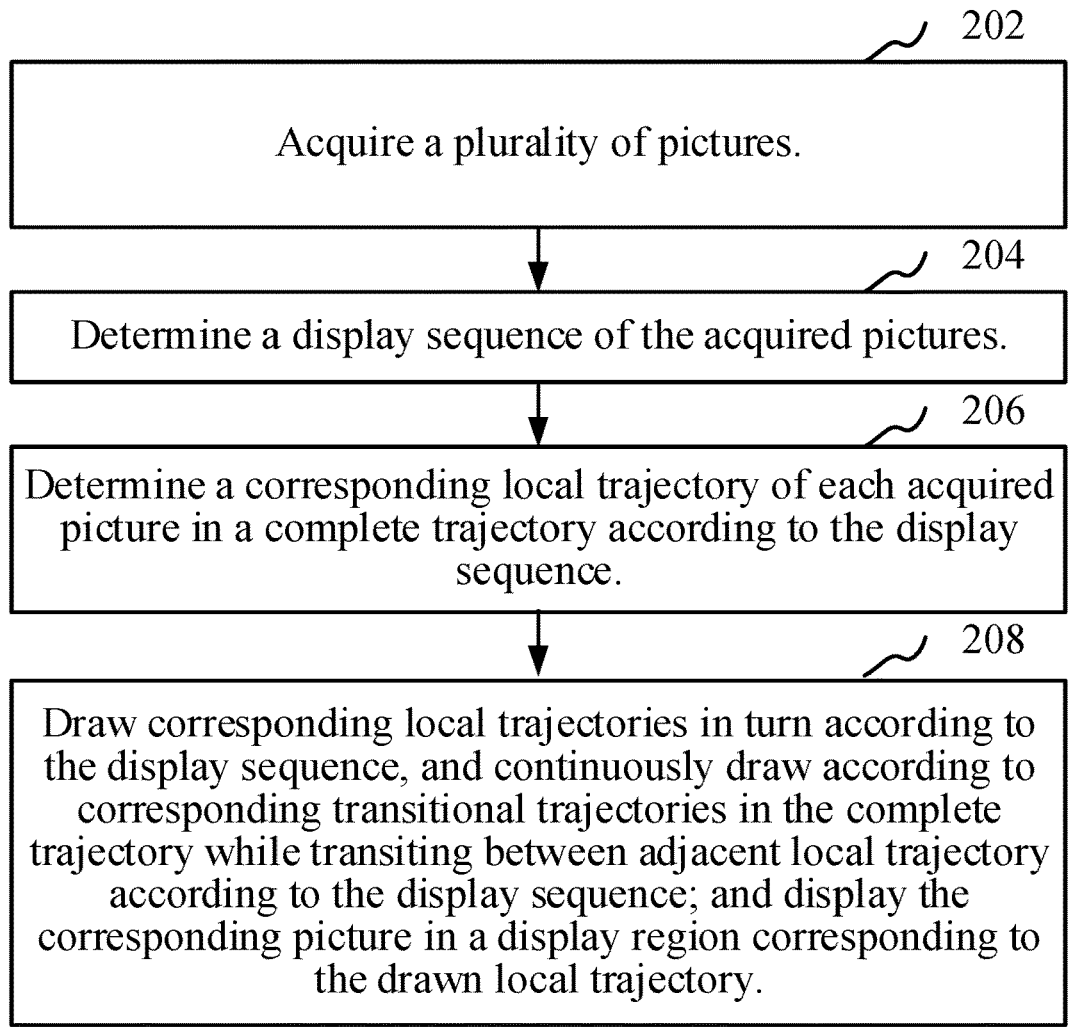
FIG. 2 is a flow diagram of a picture dynamic display method in one embodiment.

As shown in FIG. 2, in one embodiment, a picture dynamic display method is provided, and the embodiment is illustrated by applying the method to the electronic equipment shown in FIG. 1. An application program capable of displaying pictures can operate on the electronic equipment, and the picture dynamic display method is realized by the application program. The application program can be a social network application, or an instant messaging application, or the like. The method specifically includes the following steps:

Step 202: Acquire a plurality of pictures.

The pictures can be a character picture, a landscape picture, an artificially synthesized picture, or a computer synthesized picture, or the like. The electronic equipment can acquire two or more than two pictures, and the acquired pictures can be pictures having the same features, for example, pictures shot in the same travelling course, pictures shot in the same place, pictures of the same color system, and also pictures containing the same person or the same article, or the like for example.

The electronic equipment can access a webpage used for displaying the pictures, so as to trigger and acquire a plurality of pictures from the webpage. The webpage can be accessed by a webpage address obtained by scanning a two-dimensional code. The electronic equipment can be configured to provide a picture selecting control, enter a catalog selecting interface after detecting a triggering operation for the picture selecting control, detect a picture selecting instruction triggered in the catalog selecting interface, and select a plurality of pictures according to the picture selecting instruction. The electronic equipment can also acquire totally a plurality of pictures time after time, and can acquire one or more picture each time.

Step 204: Determine a display sequence of the acquired pictures.

The display sequence of the pictures means an appearing sequence of the acquired pictures when being displayed. In one embodiment, the electronic equipment can sequence the acquired pictures according to picture attributes such as the names of the pictures or the sizes of the picture, so as to determine the display sequence of each acquired picture according to a sequencing result.

Step 206: Determine a corresponding local trajectory of each acquired picture in a complete trajectory according to the display sequence.

The complete trajectory can be a continuous line in an overall state, of course, the complete trajectory can be visually presented in the forms of a full line, a dotted line, or a dot dash line, or the like, and if mathematical functions of the complete trajectories in different forms are continuous, the complete trajectory can be regarded as a continuous complete trajectory. The complete trajectory can be set in advance, can also be selected from multiple alternative complete trajectories according to user operation, and can also be generated in real time. The complete trajectory can be closed, such as a circle, an oval or an irregular closed shape; and the complete trajectory can also be opened, such as a section of curved segment or polyline. In order to present the change of the complete trajectory, the complete trajectory can deviate from a straight line.

In one embodiment, the quantity of local trajectories in the complete trajectory can be fixed. Specifically, a fixed quantity of local trajectories can be divided in advance in the complete trajectory, and the electronic equipment can select adjacent local trajectories with the quantity being the same as the quantity of the pictures from all the local trajectories, and can correspond the pictures to the selected local trajectories one to one according to the display sequence. When the quantity of the pictures exceeds the fixed quantity of the local trajectories, repeated local trajectories can be selected circularly. The local trajectories can be intercepted from the complete trajectory by a rectangle with size matched with that of a screen display region of the electronic equipment. Adjacent local trajectories means that the local trajectories adjoin in position, and the adjacent local trajectories are connected by transitional trajectories. Specifically, two adjacent local trajectories means that the two local trajectories are connected with each other by a transitional trajectory, and multiple adjacent local trajectories means that every two of these local trajectories are connected with each other by a transitional trajectory in sequence. In other embodiments, the electronic equipment can also divide local trajectories with the quantity being the same as the quantity of the pictures from the complete trajectory, and correspond the local trajectories to the acquired pictures one to one.

In one embodiment, the local trajectories in the complete trajectory are located at fixed positions in the complete trajectory. In one embodiment, the local trajectories in the complete trajectory can have a specified sequence, and the electronic equipment can select the adjacent local trajectories with the quantity being the same as the quantity of the pictures from all the local trajectories according to the sequence, for example, no matter the quantity of the pictures, the electronic equipment starts selection from the local trajectory which is marked as the first one.

Figure 3:
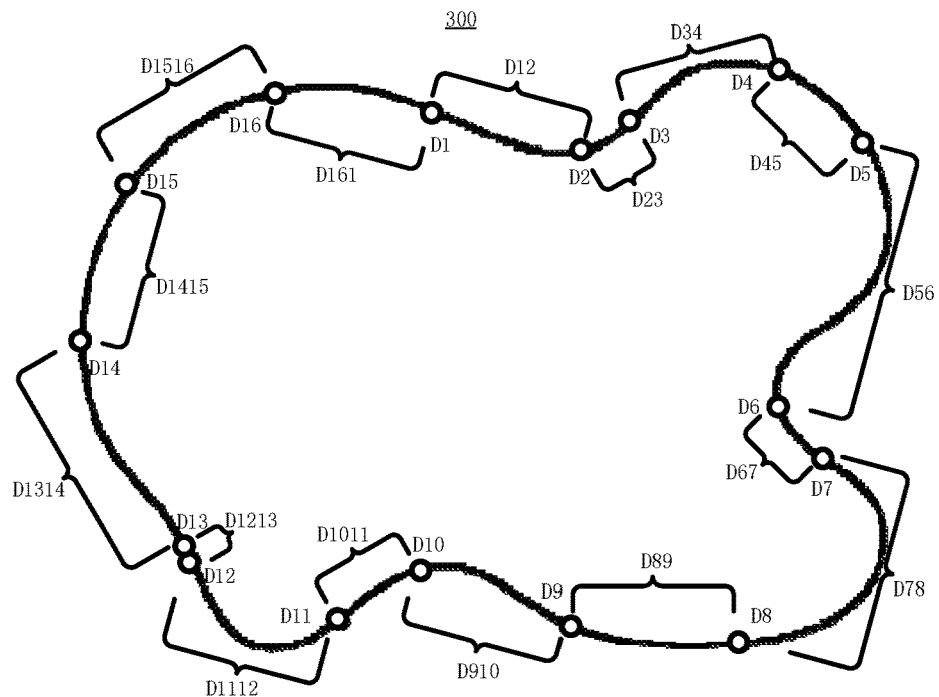
FIG. 3 is a schematic diagram of a complete trajectory in one embodiment.
Figure 4:
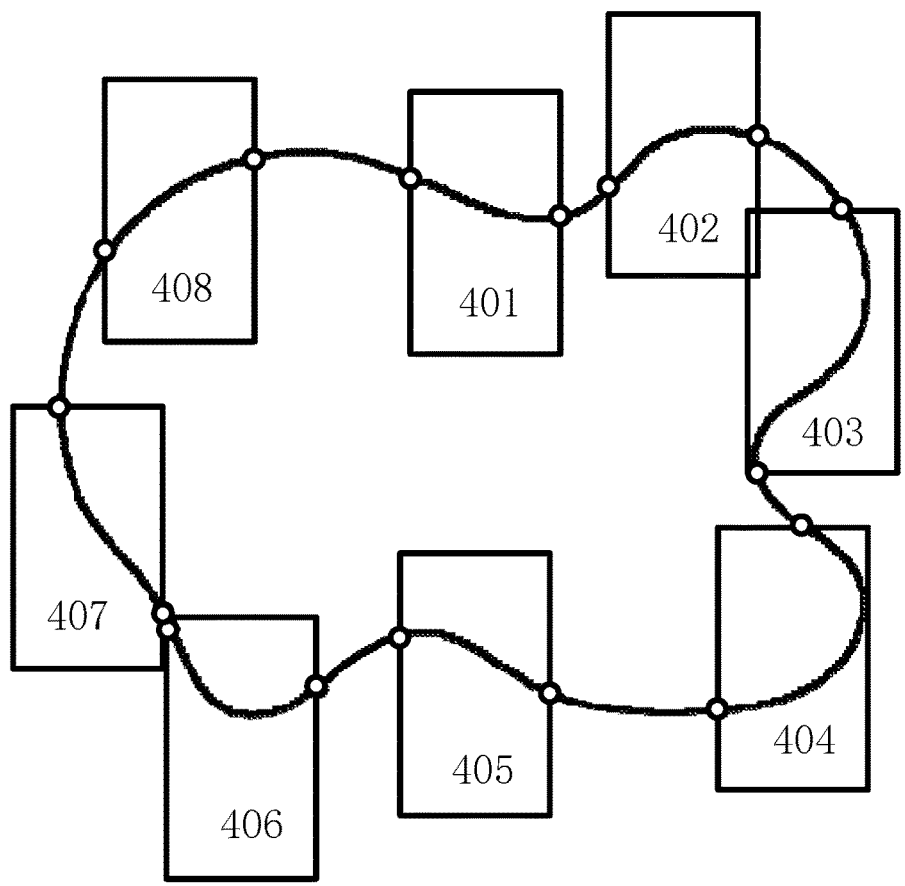
FIG. 4 is a schematic diagram of a screen display region when each local trajectory is drawn in one embodiment.

For example, referring to a complete trajectory 300 as shown in FIG. 3, the complete trajectory 300 is of a closed shape and is formed by encircling of a plurality of three-order Bezier curves. Points D1-D16 of fixed positions on the complete trajectory 300 represent endpoints of various local trajectories, that are also endpoints of the transitional trajectories. D12, D34, D56, D78, D910, D1112, D1314 and D1516 are 8 local trajectories at fixed positions in the complete trajectory 300, D23, D45, D67, D89, D1011, D1213, D1415 and D161 are 8 transitional trajectories at fixed positions in the complete trajectory 300. The local trajectory D12 is connected with the local trajectory D34 by the transitional trajectory D23. A sequence of the local trajectories can be set as D12, D34, D56, D78, D910, D1112, D1314 and D1516 in turn, and local trajectories are selected by traversing according to sequence by starting from the local trajectory D12 when the local trajectories are selected to correspond to the pictures. When the quantity of the pictures is greater than 8, traversing can be repeated by starting from the local trajectory D12 after traversing according to sequence is finished, until corresponding local trajectories are found for all the pictures.

In one embodiment, determining a corresponding local trajectory of each acquired picture in the complete trajectory according to the display sequence includes: selecting adjacent local trajectories with quantity being the same as the quantity of the pictures from a fixed quantity of local trajectories in the complete trajectory, and associating the pictures to the selected local trajectories one to one according to the display sequence.

In one embodiment, the local trajectories in the complete trajectory are located at fixed positions in the complete trajectory; and selecting the adjacent local trajectories with the quantity being the same as the quantity of the pictures from the fixed quantity of local trajectories in the complete trajectory includes: selecting the adjacent local trajectories with the quantity being the same as the quantity of the pictures according to a specified sequence from the fixed quantity of local trajectories in the complete trajectory.

Step 208: Draw corresponding local trajectories in turn according to the display sequence, and display the corresponding picture in a display region corresponding to the drawn local trajectory. The acquired picture is continuously drawn according to a corresponding transitional trajectory in the complete trajectory while the local trajectory transits to a subsequent local trajectory according to the display sequence.

Specifically, the electronic equipment draws local trajectories corresponding to the display sequence in turn according to the display sequence of the pictures, and draws by starting from a start point of the local trajectories until reaching an ending point while drawing the local trajectories. The electronic equipment can draw the local trajectories according to fixed drawing speed or fixed drawing time specifically. The drawing speed refers to length of the local trajectories drawn in unit time, and the drawing time refers to time consumed by drawing one local trajectory. Values of the drawing speed and the drawing time can be taken in a value scope visible to human eyes during the drawing of the local trajectories.

In one embodiment, the electronic equipment can draw the local trajectories by adopting SVG (Scalable Vector Graphics) based on HTML. Specifically, the electronic equipment can acquire the length of the local trajectories by an SVG path, sets the local trajectories as a dotted line with full line and dotted line length and spacing distance both being the length of the local trajectories by an SVG stroke-dasharray attribute, and controls offset length in start of a dotted line to gradually change to be 0 from the length of the local trajectories by an SVG stroke-dashoffset, thus realizing gradient drawing from the start point to the ending point of the local trajectories.

The electronic equipment displays the picture needing to the displayed according to the display sequence in the display region corresponding to the drawn local trajectory after drawing a local trajectory each time. Specifically, the electronic equipment can stay for a period of time after drawing a local trajectory each time, and display the corresponding picture in the display region corresponding to the drawn local trajectory in the staying period of time. The staying period of time can be a fixed value, and also can have a random value within the scope of the period of time. The staying period of time can be longer than drawing time of the current local trajectory, so that the picture can be sufficiently displayed, and the staying period of time can be 2 seconds. The display region corresponding to the local trajectory can cover part of a region of the local trajectory, and can also cover a region beside the local trajectory.

In one embodiment, the electronic equipment can also display a picture description text of the corresponding picture in the display region. The picture description text is a text for describing the picture, and can be characters and picture summary info input by a user or randomly selected universal descriptive sentences, and the like.

The electronic equipment starts from the ending point of the current local trajectory while switching between adjacent local trajectories, and transits to the start point of the next local trajectory according to the transitional trajectory in the complete trajectory corresponding to the adjacent local trajectories. The drawing speed of the transitional trajectories can be higher than the drawing speed of the local trajectories, so as to highlight the drawing process of the local trajectories and ensure transition smoothness and speed between the local trajectories.

Figure 5:
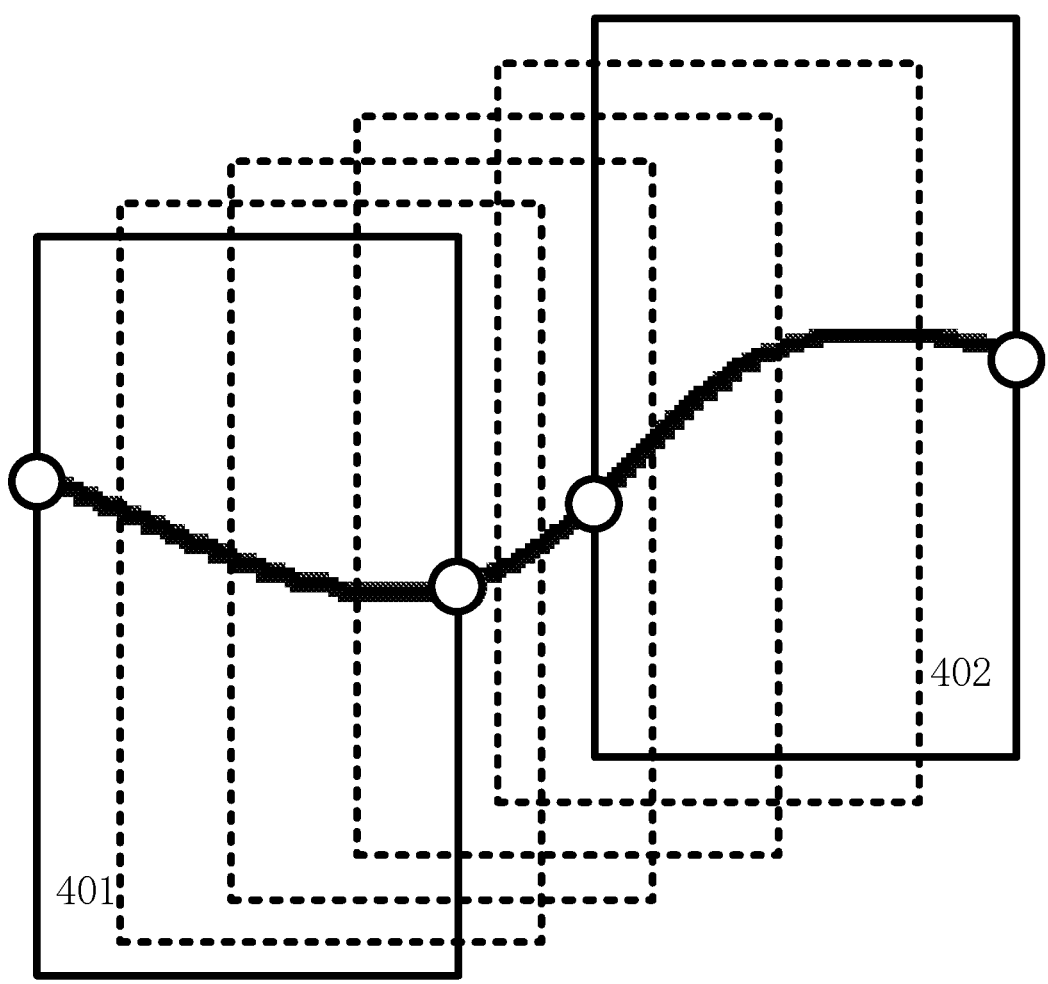
FIG. 5 is a change schematic diagram of the screen display region during transition of adjacent local trajectories in one embodiment.
Figure 6:
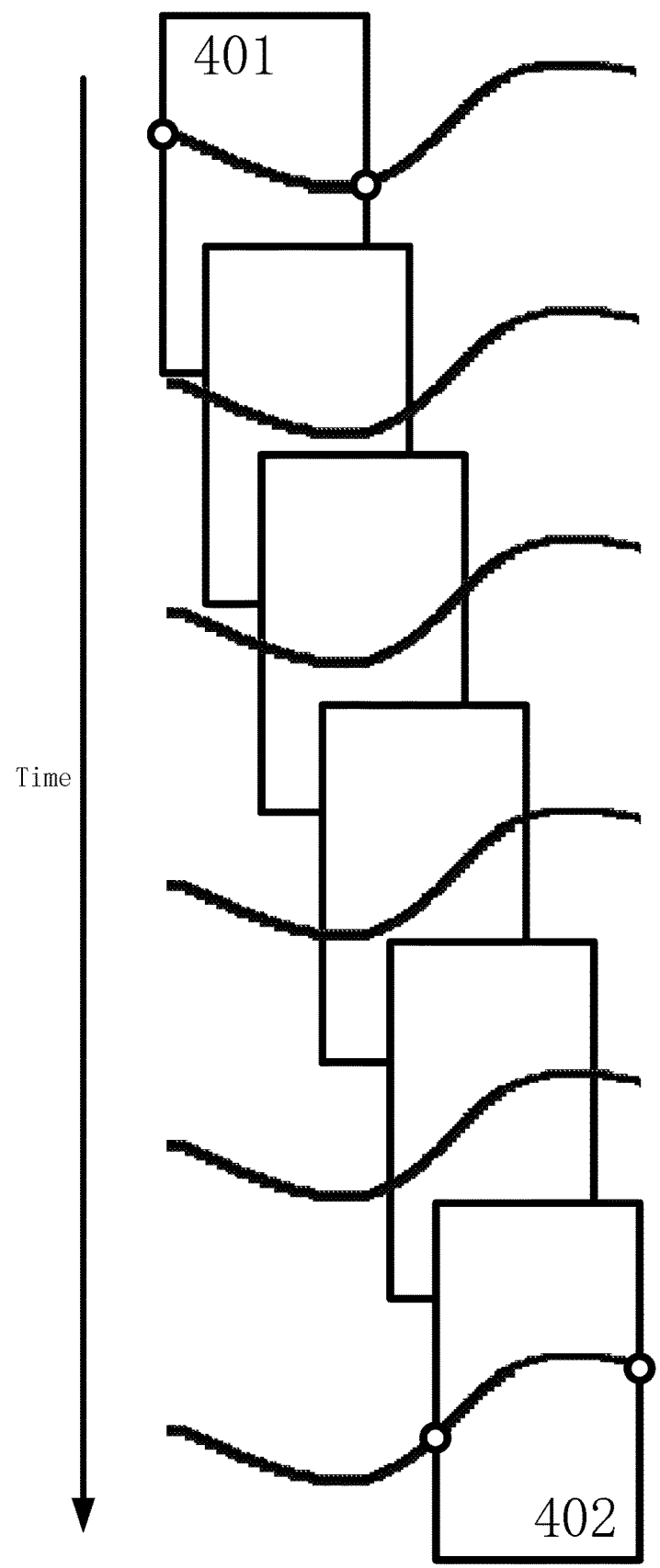
FIG. 6 is a change schematic diagram of the screen display region during transition between adjacent local trajectories in another embodiment.
Figure 7:
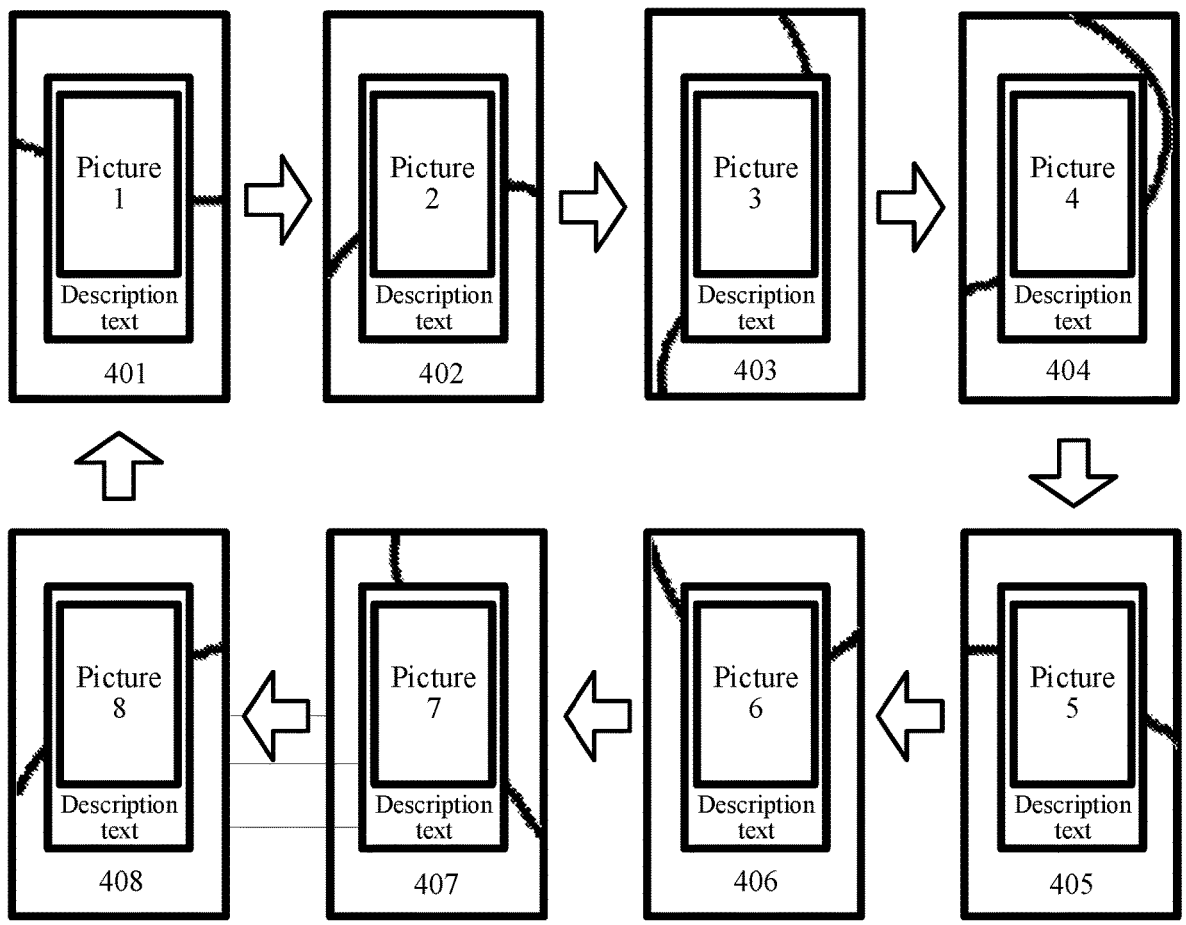
FIG. 7 is a change schematic diagram of the screen display region during drawing of a corresponding local trajectories in turn according to a display sequence and displaying of corresponding pictures in the display region corresponding to the drawn local trajectory in one embodiment.

For example, as shown in FIG. 4, 401-408 are sequentially screen display regions of the electronic equipment during drawing of each local trajectory, and the screen display regions of the electronic equipment smoothly transit according to a sequence from 401 to 408. For instance, referring to FIG. 5, gradual transition from the screen display region 401 to the screen display region 402 is achieved by sequentially passing through positions represented by the dotted line during transition from the screen display region 401 to the screen display region 402; and then referring to FIG. 6, FIG. 6 shows the change of the transitional trajectory shown by the electronic equipment in the process of transiting from the screen display region 401 to the screen display region 402. The picture displayed in the display region covering a partial local trajectory in the screen display region is as shown in FIG. 7 in the process of changing from 401 to 408 of the screen display region of the electronic equipment.

According to the abovementioned picture dynamic display method, for many pictures, the display sequence of each picture is determined, and the corresponding local trajectory of the picture is determined according to the display sequence, so that the corresponding local trajectory of each picture is also arranged according to the abovementioned display sequence in the complete trajectory. The corresponding local trajectory of each picture is drawn in turn according to the display sequence, the drawn local trajectory corresponds to a display region, and the picture corresponding to the local trajectory is displayed in the display region; and therefore, the pictures can be displayed in turn according to the display sequence, interference of user operation is not needed, and further the efficiency for the pictures to convey information is increased. Furthermore, continuous drawing is performed according to the corresponding transitional trajectory in the complete trajectory during transition between adjacent local trajectories according to the display sequence, and therefore, the overall complete trajectory can be shown along with the displaying of the pictures, the relation between pictures can be expressed in a visual form by transformation of the complete trajectory, and the efficiency for the pictures to convey information is further increased.

Figure 8:
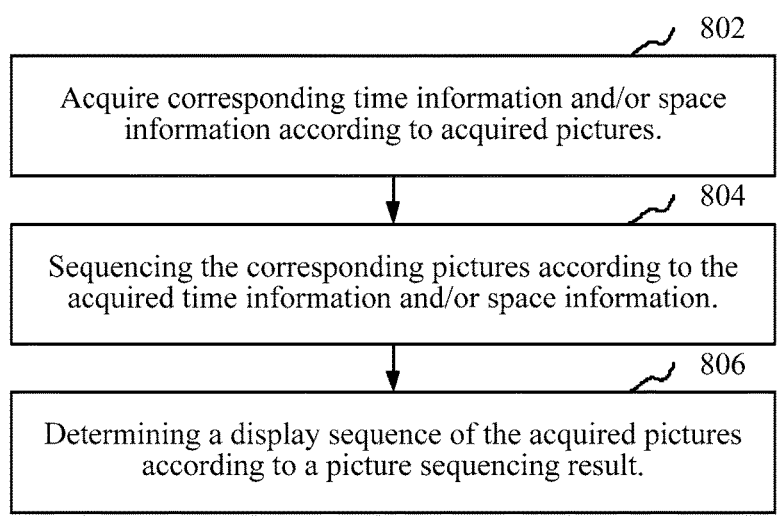
FIG. 8 is the flow diagram of a step of determining a display sequence of acquired pictures in one embodiment.

As shown in FIG. 8, in one embodiment, step 204 specifically includes the following steps:

Step 802: Acquire corresponding time information and/or geographical information according to the acquired pictures.

The time information can be modification time or shooting time of the picture, and the geographical information can be a geographic coordinate during picture shooting, or a recognized geographic position or altitude of landscapes in the picture. The time information and the geographical information can be extracted from abstract attribute of the pictures, and can also be obtained by inquiring the stored time information and/or geographical information corresponding to identifications of the pictures from a database.

Step 804: Sequence the corresponding pictures according to the acquired time information and/or geographical information.

Specifically, the electronic equipment can sequence the corresponding pictures according to a sequence of the time information from the view of time dimension. The shooting time of the pictures can reflect a generation sequence of contents in the corresponding pictures, for example, the shooting time can reflect the sequence of shooting pictures during traveling of the user, and after sequencing, the shooting time can reflect the travelling sequence of the user, and the shooting time can also be integrated with the picture description text to perform dynamic display on the pictures.

The electronic equipment can also classify the pictures according to the geographical information of the pictures in the view of space dimension, and can continuously sequence the pictures in the same space region. The geographical information can be extracted from the picture abstract information, and can also be obtained by automatic identification to the pictures. Pictures in different space regions can be sequenced according to a specific direction, for example, from north to south or from south to north. The pictures in different space regions can also be sequenced in combination with the time information.

Step 806: Determine the display sequence of the acquired pictures according to a picture sequencing result.

Specifically, the electronic equipment can directly determine a picture sorting sequence as the display sequence of the pictures, and can also adjust the picture sequencing result according to user operation, so as to obtain the display sequence of the pictures.

In the present embodiment, natural correlation among the pictures can be reflected by determining the display sequence of the pictures according to the time information and/or geographical information of the pictures, and time or geographic position change of the pictures can be reflected by the change of the complete trajectory after the pictures are displayed according to the display sequence, so as to convey more information content. For instance, it can be reflected from the change of the complete trajectory that the user moves from one scenic spot to another scenic spot according to the pictures shot by the user during travelling, thus reflecting the change of time and/or geographic positions.

Figure 9:
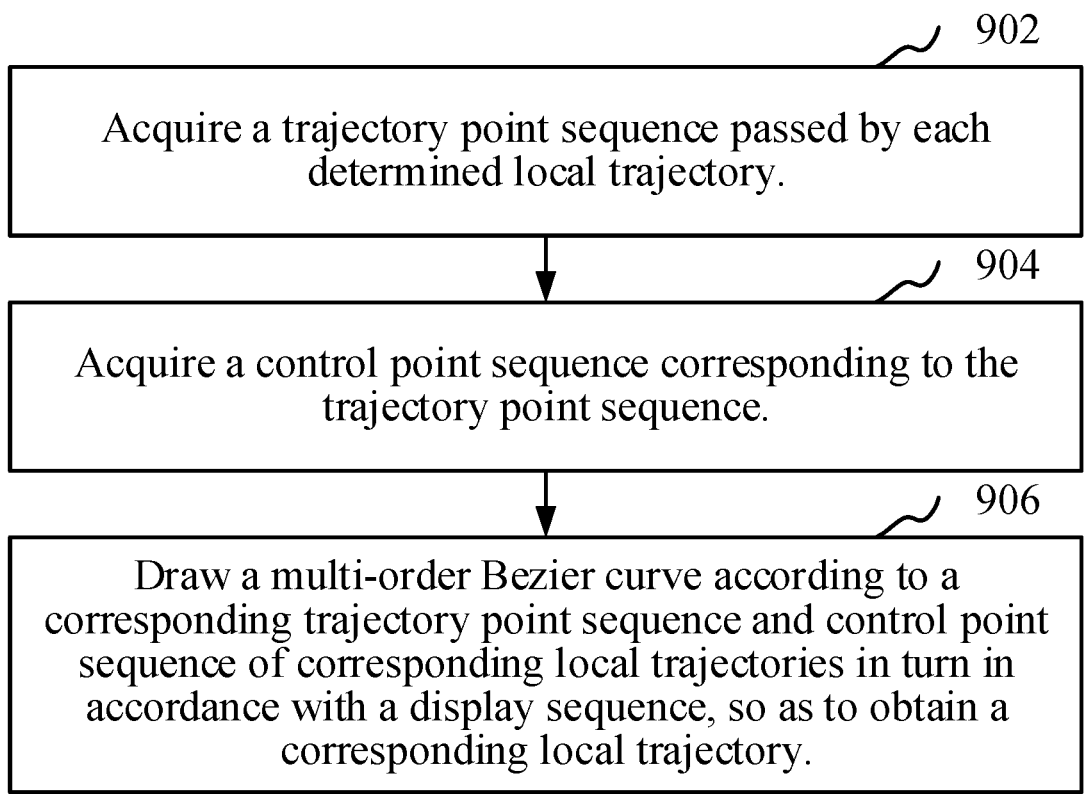
FIG. 9 is the flow diagram of a step of drawing the corresponding local trajectories in turn according to the display sequence in one embodiment.

As shown in FIG. 9, in one embodiment, the step of drawing the corresponding local trajectories in turn according to the display sequence specifically includes the following steps:

Step 902: Acquire a trajectory point sequence passed by each determined local trajectory.

Locus points are discrete points forming local trajectories. The trajectory points can be represented by horizontal and vertical coordinates relative to an origin of coordinates in the screen display region of the electronic equipment. The trajectory points are points passed by the multi-order Bezier curve when the multi-order Bezier curve is adopted for drawing the local trajectories. The multi-order Bezier curve refers to a Bezier curve of more than one order, for instance, a three-order, four-order or five-order Bezier curve. Multi-order also can be referred to as multi-time. Bezier curve is a mathematical curve applied to two-dimensional graphic application program.

The trajectory points are arranged according to a sequence of drawing corresponding local trajectories to form a trajectory point sequence. Specifically, the electronic equipment reads or calculates the trajectory point sequence passed by corresponding local trajectories needing to be drawn when the pictures are displayed before drawing the local trajectory. The quantity of the trajectory points in the trajectory point sequence can be fixed, and can be calculated according to the size of the current screen display region.

Step 904: Acquire a control point sequence corresponding to the trajectory point sequence.

Control points are points for controlling the shape of the multi-order Bezier curve, and a multi-order Bezier curve with specific shape can be drawn by the combination of a trajectory point used as an endpoint of the multi-order Bezier curve in the trajectory point sequence and the corresponding control point. The control points are arranged according to the position sequence of the multi-order Bezier curve forming the local trajectories in the corresponding local trajectories to form a control point sequence.

Step 906: Draw a multi-order Bezier curve according to the corresponding trajectory point sequence and control point sequence of corresponding local trajectories in turn in accordance with the display sequence, so as to obtain a corresponding local trajectory.

Specifically, the electronic equipment draws the local trajectories in turn according to the display sequence, and draws the multi-order Bezier curves according to the corresponding trajectory point sequence and control point sequence of the local trajectory while drawing each local trajectory so as to form the present local trajectory. The trajectory point sequence can include endpoints of the multi-order Bezier curve, and the endpoints include the start point and the ending point of the corresponding multi-order Bezier curve. Specifically, the electronic equipment can traverse the local trajectory sequence while drawing the multi-order Bezier curve according to the corresponding trajectory point sequence and control point sequence of the local trajectory while drawing each local trajectory so as to form the present local trajectory, and can determine a parameter set of each multi-order Bezier curve in the local trajectories needing to be drawn, and the parameter set includes endpoints and control points; and therefore, the corresponding multi-order Bezier curve can be drawn according to the parameter set so as to obtain the corresponding local trajectory.

In the present embodiment, the corresponding local trajectory can be drawn by drawing the multi-order Bezier curve by utilizing limited discrete points in the trajectory point sequence and the control point sequence after the corresponding trajectory point sequence and control point sequence of each local trajectory are determined, the drawing efficiency is high, and because the multi-order Bezier curve per se is a vector diagram and is smooth, the visual effect of the drawn local trajectory is good.

In one embodiment, the multi-order Bezier curve is s three-order Bezier curve; in the trajectory point sequence, every three trajectory points form one three-order Bezier curve according to a sequence; and the drawn three-order Bezier curves adjoin in sequence, and control points corresponding to the trajectory point at an adjoining part are centrally symmetric about the trajectory point at the adjoining part.

Specifically, the electronic equipment can split each multi-order Bezier curve into two half segments of multi-order Bezier curves while traversing the trajectory point sequence to determine a parameter set of each multi-order Bezier curve, each half segment of multi-order Bezier curve has a corresponding parameter set, each parameter set includes endpoints, a split point and a control point of the present half segment of multi-order Bezier curve, and each endpoint, the split point and the control point can be represented by using corresponding horizontal and vertical coordinates. The trajectory point sequence can be formed by arranging the endpoints and the split point of each half segment of multi-order Bezier curve according to a drawing sequence. The condition that three-order Bezier curves adjoin in sequence means that the ending point of one three-order Bezier curve and the start point of another three-order Bezier curve are the same point, and so on.

For example, assume that the trajectory point sequence is determined to be A(Ax, Ay), B (Bx, By), C(Cx, Cy), D(Dx, Dy) . . . according to the size of the screen display region and the fixed quantity of the trajectory points, trajectory points A and C are endpoints of one three-order Bezier curve, and specifically are a start point and an ending point respectively, and a trajectory point B is a split point of the present three-order Bezier curve. Assume that the control point sequence is a(ax, ay), b(bx, by), c(cx, cy) . . . , control points a and b are respectively two control points of the three-order Bezier curve corresponding to the trajectory points A and C. The electronic equipment can divide the parameter set as (Ax, Ay, ax, ay, Bx, By), (Bx, By, bx, by, Cx, Cy), (Cx, Cy, cx, cy, Dx, Dy) . . . , and the control point b (bx, by) and the control point c (cx, cy) are centrally symmetric about the trajectory point C (Cx, Cy).

In the present embodiment, one three-order Bezier curve is drawn by being split into two half segments of three-order Bezier curves, the three-order Bezier curves adjoin in sequence, the control points corresponding to the trajectory point at an adjoining part are centrally symmetric about the trajectory point at the adjoining part, and an integrally smooth local curve of a vector can be drawn by utilizing the discrete points, so that the trajectory change is smooth.

Figure 10:
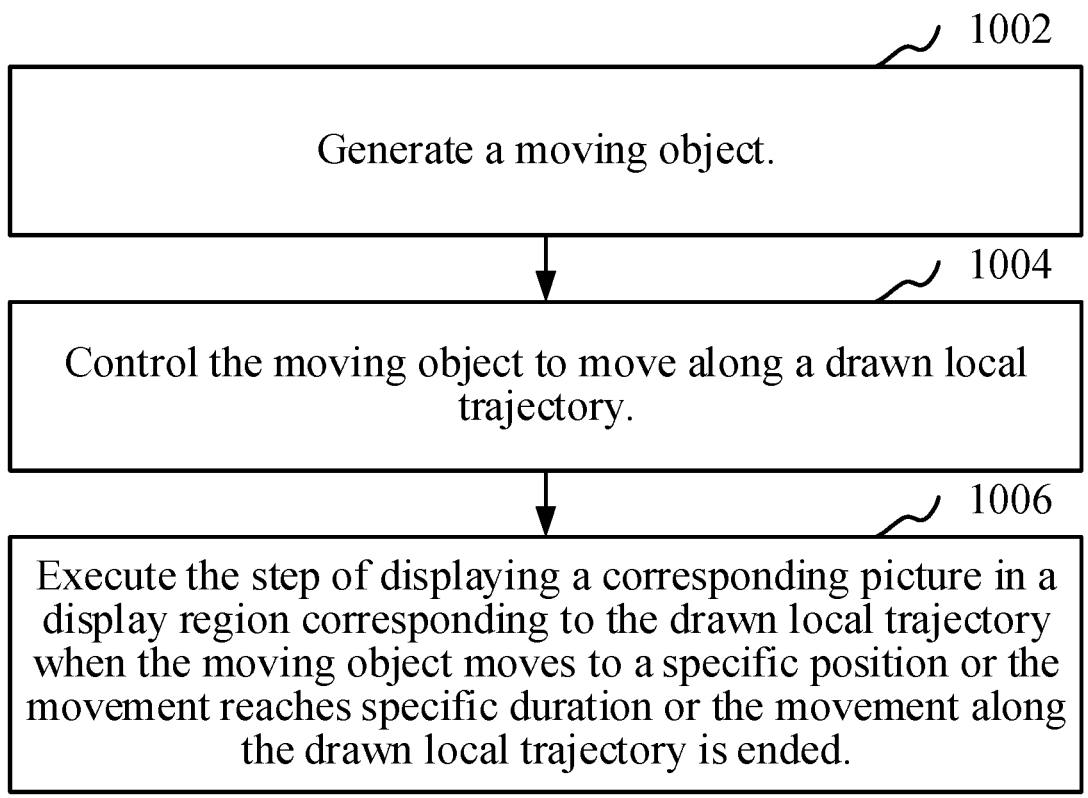
FIG. 10 is the flow diagram of a step of representing the change of the local trajectories by the movement of a moving object in one embodiment.

As shown in FIG. 10, in one embodiment, the picture dynamic display method also includes a step of representing the change of the local trajectories by the movement of a moving object, specifically including the following steps:

Step 1002: Generate the moving object.

The moving object can be a movable virtual object that can be displayed in the screen display region, for instance, a virtual image of a vehicle, or a figure image, or a cartoon image, or the like, and the vehicle can be an airplane, a train, an automobile, or a bicycle, or the like. The moving object can be enabled to move by adjusting the change of a position of the moving object along with time.

Step 1004: Control the moving object to move along a drawn local trajectory.

Specifically, the electronic equipment can control the moving object to move according to the drawn local trajectory while drawing the local trajectory or after drawing the local trajectory. Moving speed of the moving object can be higher than, equal to or lower than moving speed of the local trajectory. In one embodiment, the moving object can have a part for representing moving orientation, for instance, the nose of an airplane, and the electronic equipment can adjust the posture of the moving object to enable the moving orientation represented by the moving object to be consistent to an actual moving direction of the moving object. The electronic equipment can select a plurality of local trajectories to move to trigger the movement of the moving object, while the remaining local trajectories can only perform drawing of the local trajectories without triggering the movement of the moving object.

Step 1006: Display the corresponding pictures in the display region corresponding to the drawn local trajectory when the moving object moves to a specific position on the drawn local trajectory or the movement reaches specific duration or the movement along the drawn local trajectory is ended.

The specific position can be a position prestored in the local trajectory, and can also be calculated according to preset proportion and length of the local trajectory, and the preset proportion represents a proportion of length of the moving trajectory passed by the moving object while moving from the start point of the local trajectory to the specific position to the length of the local trajectory. The specific duration refers to time span for the moving object to move to the specific position starting from the time of moving from the start point of the local trajectory. Movement ending means that the moving object reaches the ending point of the currently drawn local trajectory.

In the present embodiment, the change of the drawn local trajectory during displaying of the pictures can be dynamically reflected by the movement of the moving object along the drawn local trajectory, and the relation among the pictures can be further expressed.

Figure 11:
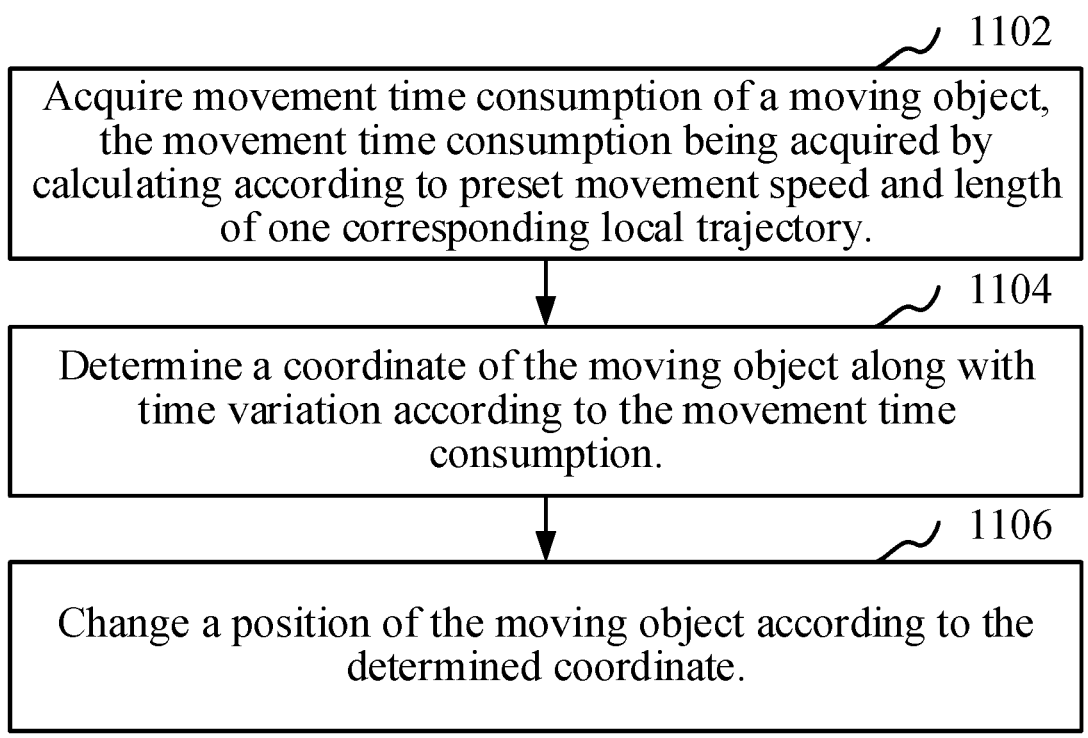
FIG. 11 is a flow diagram of a step of controlling the moving object to move along the drawn local trajectory in one embodiment.

As shown in FIG. 11, in one embodiment, the step 1004 specifically includes the following steps:

Step 1102: Acquire movement time consumption of the moving object, the movement time consumption being acquired by calculating according to preset movement speed and length of the corresponding local trajectory.

Movement time consumption is time duration needed by the moving object moving from the start point of the local trajectory to the ending point along the drawn local trajectory. Specifically, the electronic equipment can divide the length of the local trajectory by present movement speed in real time or in advance to obtain the movement time consumption of the moving object. The length of the local trajectory can be calculated by a Gauss-Legendre integral algorithm, and specifically, the electronic equipment can calculate the length of the corresponding local trajectory by dividing into 12 nodes and combining with a corresponding three-order Bezier curve.

Step 1104: Determine a coordinate of the moving object along with time variation according to movement time consumption.

Specifically, the electronic equipment can take a plurality of time points within a scope from 0 to the movement time consumption after learning the total movement time consumption needed by passing the length of the local trajectory, and calculate a coordinate of the moving object at each time point, so as to obtain a series of coordinates of the moving object along with time variation. The coordinate of the moving object along with time variation can be dynamically calculated by utilizing JavaScript.

More specifically, the electronic equipment can acquire that the movement length along with time t1 variation starting from the start point of the local trajectory is t1/T*length, T being the movement time consumption, and length being length of the local trajectory; and the electronic equipment can calculate a coordinate at the time point t1 by utilizing a Gauss-Legendre integral algorithm and the movement length at the discrete time point t1. Specifically, the corresponding Bezier curve can be gradually split by a bisection method during calculation of the coordinate, until curve length, which is approximately equal to the movement length, t1/T*length, is determined after dividing, so that a t parameter of the Bezier curve at the present moment is determined, and further the corresponding coordinate is calculated according to the t parameter. A value of the t parameter is [0, 1], representing the time variation during drawing of the corresponding Bezier curve.

Step 1106: Change a position of the moving object according to the determined coordinate.

Specifically, the electronic equipment can set the position of the moving object at a corresponding time point as a corresponding coordinate according to the coordinate along with time variation. The movement of the moving object can be controlled by a requestAnimationFrame API. The position and posture of the moving object can be changed by a matrix attribute in a CSS3 transform (CSS3 is a cascading style sheet, and transform is a rotation attribute of CSS3), and the posture can be used for adjusting the movement orientation of the moving object.

In the present embodiment, the movement time consumption of the moving object is acquired, so that the coordinate of the moving object along with time variation is determined based on the movement time consumption, and further the position of the moving object is changed according to the determined coordinate, thus realizing accurate control on the position of the moving object.

Figure 12:
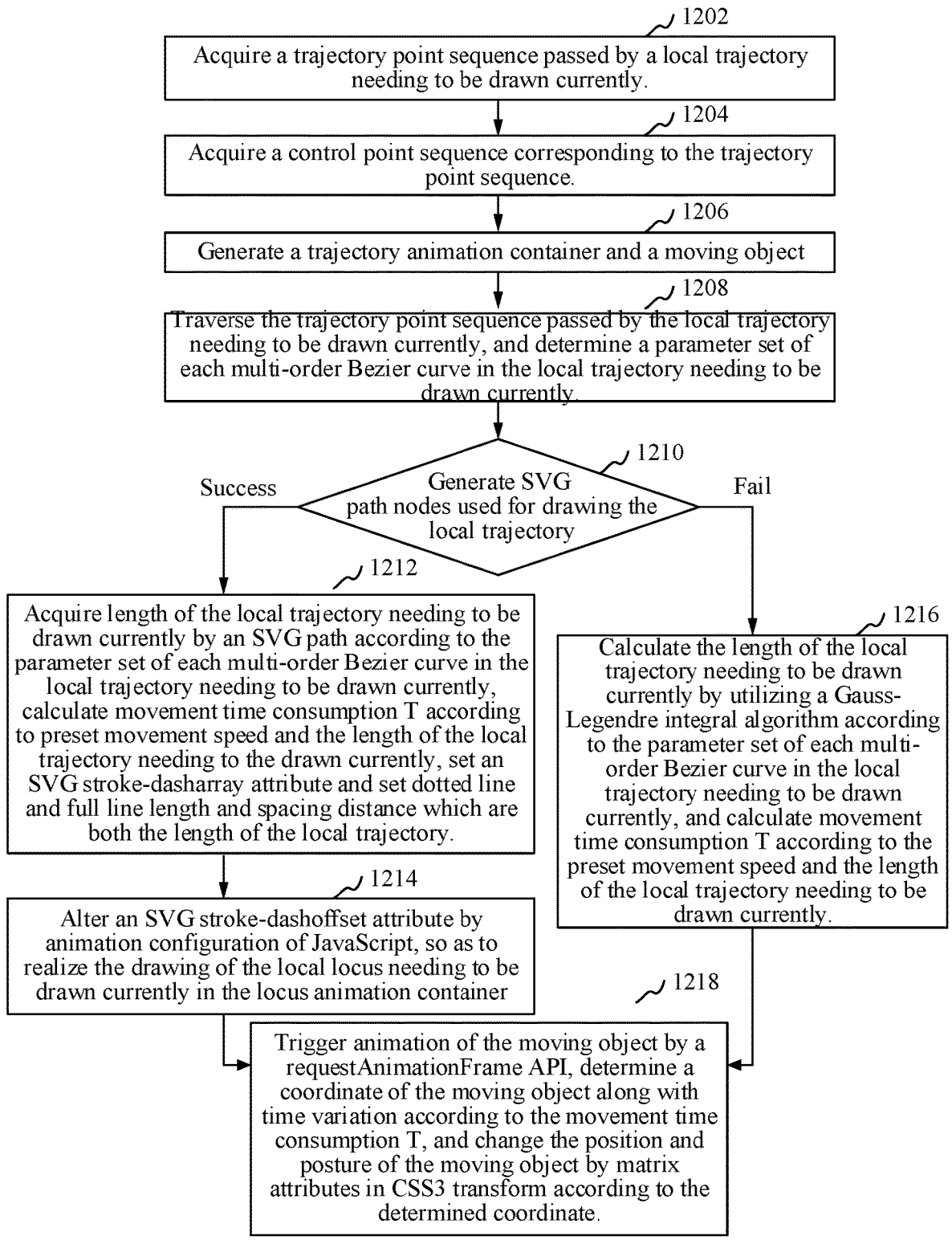
FIG. 12 is a flow diagram of a step of drawing the local trajectories and controlling the movement of the moving object in one embodiment.

As shown in FIG. 12, in one embodiment, drawing of the local trajectory and control on the movement of the moving object in the abovementioned picture dynamic display method are specifically realized by the following steps:

Step 1202: Acquire a trajectory point sequence passed by a local trajectory needing to be drawn currently.

Step 1204: Acquire a control point sequence corresponding to the trajectory point sequence.

Step 1206: Generate a trajectory animation container and a moving object.

Step 1208: Traverse the trajectory point sequence passed by the local trajectory needing to be drawn currently, and determine a parameter set of each multi-order Bezier curve in the local trajectory needing to be drawn currently.

Step 1210: Generate SVG path nodes used for drawing the local trajectory. If generation is successful, call an SVG function provided by a rendering engine to perform step 1212; and if generation is failed, perform step 1216 by a user-defined algorithm of an application program. The rendering engine can be integrated in the application program. The application program in the embodiment may not be a browser.

Step 1212: Acquire length of the local trajectory needing to be drawn currently by an SVG path according to the parameter set of each multi-order Bezier curve in the local trajectory needing to be drawn currently, calculate movement time consumption T according to preset movement speed and the length of the local trajectory needing to the drawn currently, set an SVG stroke-dasharray attribute, and set dotted line and full line length and spacing distance both to be the length of the local trajectory.

Step 1214: Alter the SVG stroke-dashoffset attribute by the animation configuration of JavaScript, so as to realize the drawing of the local trajectory needing to be drawn currently in the trajectory animation container.

Step 1216: Calculate the length of the local trajectory needing to be drawn currently by utilizing a Gauss-Legendre integral algorithm according to the parameter set of each multi-order Bezier curve in the local trajectory needing to be drawn currently, and calculate movement time consumption T according to the preset movement speed and the length of the local trajectory needing to be drawn currently.

Step 1218: Trigger animation of the moving object by a requestAnimationFrame API, determine a coordinate of the moving object along with time variation according to the movement time consumption T, and change the position and posture of the moving object by matrix attribute in CSS3 transform according to the determined coordinate.

In the present embodiment, drawing of the local trajectories can be completed by utilizing the SVG path via the rendering engine when the SVG path nodes are successfully generated, and therefore, drawing of the local trajectories can be efficiently realized. The path of the local trajectory may not be generated when generation of the SVG path nodes is failed, and a terminal which does not support the SVG path or a terminal which is not ideal in supporting the SVG path can be compatible, so that the compatibility is improved. Subsequently, the moving object is controlled to move along the local trajectory, so that not only can the relation among the pictures be expressed, but also the shape of the local trajectory can be reflected by the moving trajectory of the moving object under the condition of failing to draw the local trajectory by the SVG path.

Figure 13:
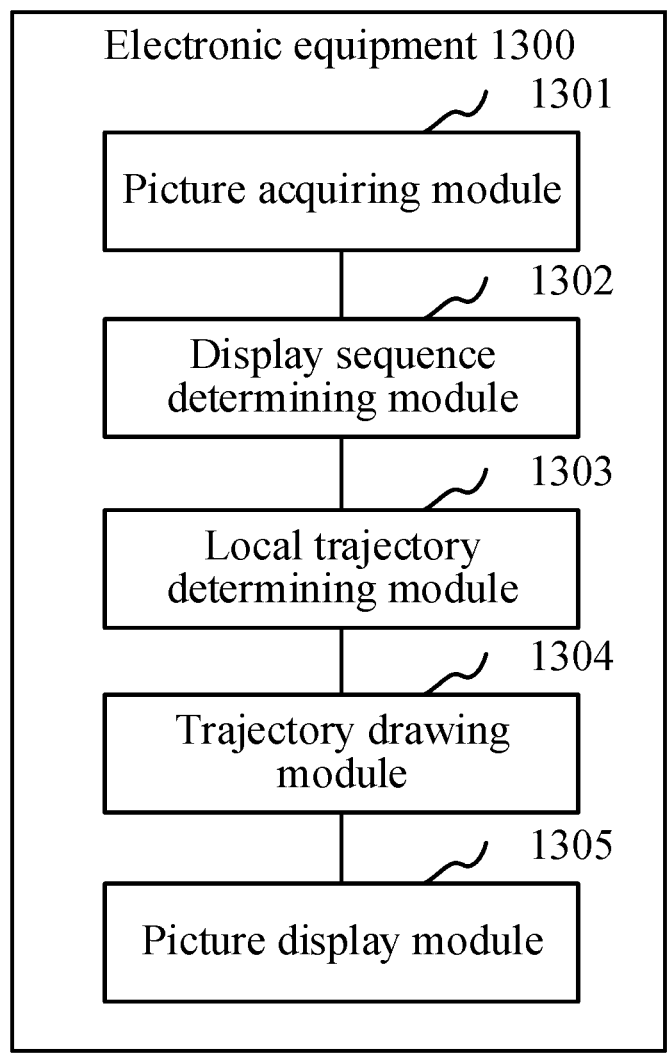
FIG. 13 is the structure diagram of the electronic equipment in one embodiment.

As shown in FIG. 13, in one embodiment, electronic equipment 1300 is provided, including a picture acquiring module 1301, a display sequence determining module 1302, a local trajectory determining module 1303, a trajectory drawing module 1304 and a picture display module 1305.

The picture acquiring module 1301 is configured to acquire a plurality of pictures.

A display sequence of the pictures refers to an appearing sequence of the pictures during displaying. In one embodiment, the picture acquiring module 1301 can be configured to sequence the acquired pictures according to picture attributes such as the names of the pictures and the sizes of the pictures, so as to determine the display sequence of each acquired picture according to a sequencing result.

The display sequence determining module 1302 is configured to determine the display sequence of the acquired pictures.

The display sequence of the pictures refers to the appearing sequence of the acquired pictures during displaying. In one embodiment, the display sequence determining module 1302 can be configured to sequence the acquired pictures according to picture attributes such as the names of the pictures and the size of the pictures, so as to determine the display sequence of each acquired picture according to a sequencing result.

The local trajectory determining module 1303 is configured to determine a corresponding local trajectory of each picture in a complete trajectory according to the display sequence.

The complete trajectory can be a continuous line in an overall state, of course, the complete trajectory can be visually presented in the forms of a full line, a dotted line. or a dot dash line, or the like, and if mathematical functions of the complete trajectory in different forms are continuous, the complete trajectory can be regarded as a continuous complete trajectory. The complete trajectory can be set in advance, can also be selected from multiple alternative complete trajectories according to user operation, and can also be generated in real time. The complete trajectory can be closed, such as a circle, an oval or an irregular closed shape; and the complete trajectory can also be opened, such as a section of curved segment or polyline. In order to present the change of the complete trajectory, the complete trajectory can deviate from a straight line.

In one embodiment, the quantity of local trajectories in the complete trajectory can be fixed. Specifically, a fixed quantity of local trajectories can be divided in advance in the complete trajectory, and the local trajectory determining module 1303 can select adjacent local trajectories with the quantity being the same as the quantity of the pictures from all the local trajectories, and can correspond the pictures to the selected local trajectories one to one according to the display sequence. When the quantity of the pictures exceeds the fixed quantity of the local trajectories, repeated local trajectories can be selected circularly. The local trajectories can be intercepted from the complete trajectory by a rectangle with size matched with that of a screen display region of the electronic equipment. Adjacent local trajectories mean that the local trajectories adjoin in position, and the adjacent local trajectories are connected by transitional trajectories. Specifically, two adjacent local trajectories mean that the two local trajectories are connected with each other by a transitional trajectory, and multiple adjacent local trajectories means that every two of these local trajectories are connected with each other by a transitional trajectory in sequence. In other embodiments, the local trajectory determining module 1303 can also divide local trajectories with the quantity being the same as the quantity of the pictures from the complete trajectory in real time, and correspond the local trajectories to the acquired pictures one to one.

In one embodiment, the local trajectories in the complete trajectory are located at fixed positions in the complete trajectory. In one embodiment, the local trajectories in the complete trajectory can have a specified sequence, and the local trajectory determining module 1303 can be configured to select the adjacent local trajectories with the quantity being the same as the quantity of the pictures from all the local trajectories according to the sequence, for example, no matter the quantity of the pictures, the local trajectory determining module 1303 starts selection from the local trajectory which is marked as the first one.

The trajectory drawing module 1304 is configured to draw corresponding local trajectories in turn according to the display sequence, and perform continuous drawing according to the corresponding transitional trajectory in the complete trajectory during transition between adjacent local trajectories according to the display sequence.

Specifically, the trajectory drawing module 1304 draws local trajectories corresponding to the display sequence in turn according to the display sequence of the pictures, and draws by starting from the start point of the local trajectories until reaching the ending point while drawing the local trajectories. The trajectory drawing module 1304 can draw the local trajectories according to fixed drawing speed or fixed drawing time specifically. The drawing speed herein refers to length of the local trajectories drawn in unit time, and the drawing time herein refers to time consumed by drawing one local trajectory. Values of the drawing speed and the drawing time can be taken in a value scope visible to human eyes during the drawing of the local trajectories.

In one embodiment, the trajectory drawing module 1304 can draw the local trajectories by adopting SVG (Scalable Vector Graphics) based on HTML. Specifically, the trajectory drawing module 1304 can acquire length of the local trajectories by an SVG path, sets the local trajectories as the dotted line with dotted line and full line length and spacing distance both being the length of the local trajectories by an SVG stroke-dasharray attribute, and controls offset length in start of a dotted line to gradually change to be 0 from the length of the local trajectories by SVG stroke-dashoffset, thus realizing gradient drawing from the start point to the ending point of the local trajectories.

The trajectory drawing module 1304 can start from the ending point of the current local trajectory while switching between adjacent local trajectories and transit to the start point of the next local trajectory according to the transitional trajectory, in the complete trajectory, corresponding to the adjacent local trajectories. Drawing speed of the transitional trajectories can be higher than the drawing speed of the local trajectories, so as to highlight the drawing process of the local trajectories and ensure transition smoothness and speed between the local trajectories.

The picture display module 1305 is configured to display corresponding pictures in the display region corresponding to the drawn local trajectories.

The picture display module 1305 can be configured to display the picture needing to the displayed according to the display sequence in the display region corresponding to the drawn local trajectory after drawing a local trajectory each time. Specifically, the trajectory drawing module 1304 can stay for a period of time after drawing a local trajectory each time, and the picture display module 1305 displays the corresponding picture in the display region corresponding to the drawn local trajectory in the staying period of time. The staying period of time can be a fixed value, and can have a random value within the scope of the period of time. The staying period of time can be longer than the drawing time of the current local trajectory, so that the picture can be sufficiently displayed, and the staying period of time can be 2 seconds. The display region corresponding to the local trajectory can cover part of a region of the local trajectory, and can also cover a region beside the local trajectory.

In one embodiment, the picture display module 1305 can also display a picture description text of the corresponding picture in the display region. The picture description text is a text for describing the picture, and can be characters and picture summary info input by the user, or randomly selected universal descriptive sentences, or the like.

For many pictures, the foregoing electronic equipment 1300 determines the display sequence of each picture and determines the corresponding local trajectory of the picture according to the display sequence, so that the corresponding local trajectory of each picture is also arranged according to the abovementioned display sequence in the complete trajectory. The corresponding local trajectory of each picture is drawn in turn according to the display sequence, the drawn local trajectory corresponds to a display region, and the picture corresponding to the local trajectory is displayed in the display region; and therefore, the pictures can be displayed in turn according to the display sequence, interference of user operation is not needed, and further the efficiency for the pictures to convey information is increased. Furthermore, continuous drawing is performed according to the corresponding transitional trajectory in the complete trajectory during transition between adjacent local trajectories according to the display sequence; and therefore, the overall complete trajectory can be shown along with the displaying of the pictures, the relation between pictures can be expressed in a visual form by transformation of the complete trajectory, and the efficiency for the pictures to convey information is further increased.

In one embodiment, the complete trajectory is closed; the quantity of the local trajectories in the complete trajectory is fixed; and the local trajectories in the complete trajectory are located at fixed positions in the complete trajectory.

In one embodiment, the display sequence determining module 1302 is also configured to acquire corresponding time information and/or geographical information according to the acquired pictures; sequence the corresponding pictures according to the acquired time information and/or geographical information; and determine a display sequence of the acquired pictures according to a picture sequencing result.

In the present embodiment, natural correlation among the pictures can be reflected by determining the display sequence of the pictures according to the time information and/or geographical information of the pictures, and time or geographic position change of the pictures can be reflected by the change of the complete trajectory after the pictures are displayed according to the display sequence, so as to convey more information content. For instance, it can be reflected from the change of the complete trajectory that the user moves from one scenic spot to another scenic spot according to the pictures shot by the user during travelling, thus reflecting the change of time and/or geographic positions.

In one embodiment, the trajectory drawing module 1304 is also configured to acquire a trajectory point sequence passed by each determined local trajectory; acquire a control point sequence corresponding to the trajectory point sequence; and draw a multi-order Bezier curve according to the corresponding trajectory point sequence and control point sequence of corresponding local trajectories in turn in accordance with the display sequence, so as to obtain a corresponding local trajectory.

In the present embodiment, the corresponding local trajectory can be drawn by drawing the multi-order Bezier curve by utilizing limited discrete points in the trajectory point sequence and the control point sequence after the corresponding trajectory point sequence and control point sequence of each local trajectory are determined, the drawing efficiency is high, and because the multi-order Bezier curve per se is a vector diagram and is smooth, the visual effect of the drawn local trajectory is good.

In one embodiment, the multi-order Bezier curve is a three-order Bezier curve; in the trajectory point sequence, every three trajectory points form one three-order Bezier curve according to a sequence; and the drawn three-order Bezier curves adjoin in sequence, and control points corresponding to the trajectory point at an adjoining part are centrally symmetric about the trajectory point at the adjoining part.

In the present embodiment, one multi-order Bezier curve is split into two half segments of three-order Bezier curves, the three-order Bezier curves adjoin in sequence, the control points corresponding to the trajectory point at the adjoining part are centrally symmetric about the trajectory point at the adjoining part, and an integrally smooth local curve of a vector can be drawn by utilizing the discrete points, so that the trajectory change is smooth.

Figure 14:
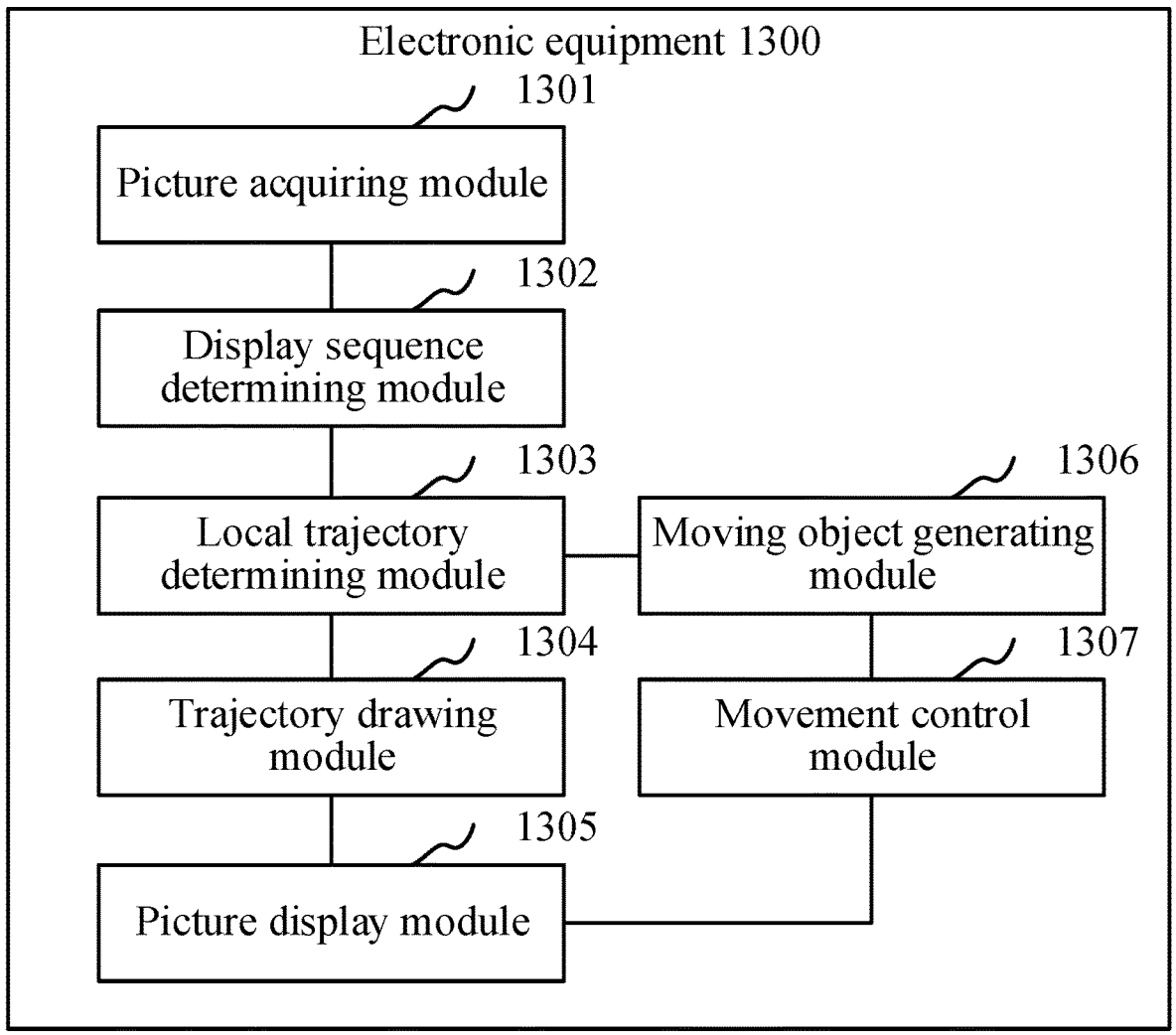
FIG. 14 is the structure diagram of the electronic equipment in another embodiment.

As shown in FIG. 14, in one embodiment, the electronic equipment 1300 further includes: a moving object generating module 1306 and a movement control module 1307.

The moving object generating module 1306 is configured to generate a moving object.

The movement control module 1307 is configured to control the moving object to move along a drawn local trajectory.

The picture display module 1305 is configured to perform displaying of corresponding pictures in a corresponding display region of the drawn local trajectory when the moving object moves to a specific position or the movement reaches specific duration or the movement along the drawn local trajectory is ended.

In the present embodiment, the change of the drawn local trajectory during displaying of the pictures can be dynamically reflected by the movement of the moving object along the drawn local trajectory, and the relation among the pictures can be further expressed.

In one embodiment, the movement control module 1307 is also configured to acquire movement time consumption of the moving object, the movement time consumption being acquired by calculating according to preset movement speed and length of the corresponding local trajectory; determine a coordinate of the moving object along with time variation according to the movement time consumption; and change a position of the moving object according to the determined coordinate.

In the present embodiment, the movement time consumption of the moving object is acquired, so that the coordinate of the moving object along with time variation is determined based on the movement time consumption, and further the position of the moving object is changed according to the determined coordinate, thus realizing accurate control on the position of the moving object.

In one embodiment, electronic equipment includes a memory and a processor, the memory storing a computer readable instruction, and the processor being enabled to perform the following steps when the computer readable instruction is executed by the processor: acquiring a plurality of pictures; determining a display sequence of the acquired pictures; determining a corresponding local trajectory of each acquired picture in a complete trajectory according to the display sequence; drawing corresponding local trajectories in turn according to the display sequence, and wherein the acquired picture is continuously drawn according to a corresponding transitional trajectory in the complete trajectory while the local trajectory transits to a subsequent local trajectory according to the display sequence; and displaying a corresponding acquired picture in a display region corresponding to each drawn local trajectory.

In one embodiment, the quantity of the local trajectories in the complete trajectory is fixed; and the local trajectories in the complete trajectory are located at fixed positions in the complete trajectory.

In one embodiment, determining the corresponding local trajectory of each picture in the complete trajectory according to the display sequence includes: selecting adjacent local trajectories with quantity being the same as the quantity of the pictures from a fixed quantity of local trajectories in the complete trajectory, and associating the pictures to the selected local trajectories one to one according to the display sequence.

In one embodiment, the local trajectories in the complete trajectory are located at fixed positions in the complete trajectory; and selecting adjacent local trajectories with quantity being the same as the quantity of the pictures from a fixed quantity of local trajectories in the complete trajectory includes: selecting the adjacent local trajectories with the quantity being the same as the quantity of the pictures according to a specified sequence from the fixed quantity of local trajectories in the complete trajectory.

In one embodiment, determining the display sequence of the acquired pictures includes: acquiring corresponding time information and/or geographical information according to the acquired pictures; sequencing the corresponding pictures according to the acquired time information and/or geographical information; and determining the display sequence of the acquired pictures according to a picture sequencing result.

In one embodiment, drawing corresponding local trajectories in turn according to the display sequence includes: acquiring a trajectory point sequence passed by each determined local trajectory; acquiring a control point sequence corresponding to the trajectory point sequence; and drawing a multi-order Bezier curve according to the corresponding trajectory point sequence and control point sequence of corresponding local trajectories in turn in accordance with the display sequence, so as to obtain a corresponding local trajectory.

In one embodiment, the multi-order Bezier curve is a three-order Bezier curve; in the trajectory point sequence, every three trajectory points form a three-order Bezier curve according to a sequence; and the drawn three-order Bezier curves adjoin in sequence, and control points corresponding to the trajectory point at an adjoining part are centrally symmetric about the trajectory point at the adjoining part.

In one embodiment, the processor is also enabled to perform the following steps when the computer readable instruction is executed by the processor: generating a moving object; controlling the moving object to move along the drawn local trajectory; and displaying a corresponding picture in the display region corresponding to the drawn local trajectory when the moving object moves to a specific position on the drawn local trajectory or the movement reaches specific duration or the movement along the drawn local trajectory is ended.

In one embodiment, controlling the moving object to move along the drawn local trajectory include: acquiring movement time consumption of the moving object, the movement time consumption being acquired by calculating according to preset movement speed and length of the corresponding local trajectory; determining a coordinate of the moving object along with time variation according to the movement time consumption; and changing a position of the moving object according to the determined coordinate.

For many pictures, the electronic equipment determines the display sequence of each picture and determines the corresponding local trajectory of the picture according to the display sequence, so that the corresponding local trajectory of each picture is also arranged according to the abovementioned display sequence in the complete trajectory. The corresponding local trajectory of each picture is drawn in turn according to the display sequence, the drawn local trajectory corresponds to a display region, and the picture corresponding to the local trajectory is displayed in the display region, and therefore, the pictures can be displayed in turn according to the display sequence, interference of user operation is not needed, and further the efficiency for the pictures to convey information is increased. Furthermore, continuous drawing is performed according to the corresponding transitional trajectory in the complete trajectory during transition between adjacent local trajectories according to the display sequence, and therefore, the overall complete trajectory is shown along with the displaying of the pictures, the relation between pictures can be expressed in a visual form by transformation of the complete trajectory, and the efficiency for the pictures to convey information is further increased.

In one embodiment, one or more computer readable nonvolatile storage media storing a computer readable instruction are configured, and one or more processors are enabled to perform the following steps when the computer readable instruction is executed by the one or more processors: acquiring a plurality of pictures; determining a display sequence of the acquired pictures; determining a corresponding local trajectory of each acquired picture in a complete trajectory according to the display sequence; drawing corresponding local trajectories in turn according to the display sequence, and wherein the acquired picture is continuously drawn according to a corresponding transitional trajectory in the complete trajectory while the local trajectory transits to a subsequent local trajectory according to the display sequence; and displaying a corresponding acquired picture in a display region corresponding to each drawn local trajectory.

In one embodiment, determining the display sequence of the acquired pictures includes: acquiring corresponding time information and/or geographical information according to the acquired pictures; sequencing the corresponding pictures according to the acquired time information and/or geographical information; and determining the display sequence of the acquired pictures according to a picture sequencing result.

In one embodiment, drawing corresponding local trajectories in turn according to the display sequence includes: acquiring a trajectory point sequence passed by each determined local trajectory; acquiring a control point sequence corresponding to the trajectory point sequence; and drawing a multi-order Bezier curve according to the corresponding trajectory point sequence and control point sequence of corresponding local trajectories in turn in accordance with the display sequence, so as to obtain a corresponding local trajectory.

In one embodiment, one or more processors are also enabled to perform the following steps when the computer readable instruction is executed by the one or more processors: generating a moving object; controlling the moving object to move along a drawn local trajectory; and displaying a corresponding picture in the display region corresponding to the drawn local trajectory when the moving object moves to a specific position on the drawn local trajectory or the movement reaches specific duration or the movement along the drawn local trajectory is ended.

In one embodiment, controlling the moving object to move along a drawn local trajectory includes: acquiring movement time consumption of the moving object, the movement time consumption being acquired by calculating according to preset movement speed and length of the corresponding local trajectory; determining a coordinate of the moving object along with time variation according to the movement time consumption; and changing a position of the moving object according to the determined coordinate.

For many pictures, the abovementioned computer readable storage medium determines the display sequence of each picture, and determines the corresponding local trajectory of the picture according to the display sequence, so that the corresponding local trajectory of each picture is also arranged according to the abovementioned display sequence in the complete trajectory. The corresponding local trajectory of each picture is drawn in turn according to the display sequence, the drawn local trajectory corresponds to a display region, and the picture corresponding to the local trajectory is displayed in the display region; and therefore, the pictures can be displayed in turn according to the display sequence, interference of user operation is not needed, and further the efficiency for the pictures to convey information is increased. Furthermore, continuous drawing is performed according to the corresponding transitional trajectory in the complete trajectory during transition between adjacent local trajectories according to the display sequence, and therefore, the overall complete trajectory can be shown along with the displaying of the pictures, the relation between pictures can be expressed in a visual form by transformation of the complete trajectory, and the efficiency for the pictures to convey information is further increased.

A person of ordinary skill in the art can understand that all or partial procedures for realizing the method in the foregoing embodiments can be completed by instructing related hardware via a computer program, the computer program can be stored in a computer readable storage medium, and the procedures of the embodiment of each of the abovementioned methods can be included when the program is executed. The abovementioned storage medium can be nonvolatile storage media such as diskettes, optical disks and read-only memories (ROM), or random access memories (RAM), or the like.

Technical features of the foregoing embodiments can be randomly combined, and in order to make the description concise, description is not made for all possible combinations of all technical features of the foregoing embodiments, however, the combinations of these technical features should be regarded as the scope recorded by the description as long as the combinations do not have conflict.

The foregoing embodiments only describe several implementation manners of this application, and their description is specific and detailed, but cannot therefore be understood as a limitation to the patent scope of the present disclosure. It should be noted that a person of ordinary skill in the art may further make variations and improvements without departing from the conception of this application, and these all fall within the protection scope of this application. Therefore, the patent protection scope of the present disclosure should be subject to the appended claims.

What is claimed is:

1. A picture dynamic display method performed at a computing device having one or more processors and memory storing a plurality of programs to be executed by the one or more processors, the method comprising:
   acquiring a plurality of pictures;
   determining a display sequence of the acquired pictures according to time information and/or geographical information associated with shooting of the acquired pictures;
   determining a corresponding local trajectory of each acquired picture in a complete trajectory according to the time information and/or geographical information associated with the shooting of the acquired picture in the display sequence;
   drawing corresponding local trajectories in turn according to the display sequence; and
   displaying a corresponding acquired picture in a display region adjacent each drawn local trajectory, further including:
      moving the display region including the acquired picture continuously along a corresponding transitional trajectory in the complete trajectory; and
      replacing the acquired picture with a second acquired picture displayed adjacent a subsequent local trajectory when the local trajectory transits to the subsequent local trajectory according to the display sequence,
   the drawing the corresponding local trajectories in turn according to the display sequence comprises:
   acquiring a trajectory point sequence passed by each determined local trajectory;
   acquiring a control point sequence corresponding to the trajectory point sequence; and
   drawing a multi-order Bezier curve according to the corresponding trajectory point sequence and control point sequence of corresponding local trajectories in turn in accordance with the display sequence, so as to obtain a corresponding local trajectory, and where the multi-order Bezier curve is a three-order Bezier curve; in the trajectory point sequence, every three trajectory points form a three-order Bezier curve according to a sequence; and the drawn three-order Bezier curves adjoin in sequence, and control points corresponding to the trajectory point at an adjoining part are centrally symmetric about the trajectory point at the adjoining part.

2. The method of claim 1, wherein the quantity of the local trajectories in the complete trajectory is fixed; and the local trajectories in the complete trajectory are located at fixed positions in the complete trajectory.

3. The method of claim 1, wherein the determining the corresponding local trajectory of each acquired picture in the complete trajectory according to the display sequence comprises:
   selecting adjacent local trajectories with quantity being the same as the quantity of the pictures from a fixed quantity of local trajectories in the complete trajectory; and
   associating the pictures to the selected local trajectories one to one according to the display sequence.

4. The method of claim 3, wherein the local trajectories in the complete trajectory are located at fixed positions in the complete trajectory; and selecting the adjacent local trajectories with the quantity being the same as the quantity of the pictures from the fixed quantity of local trajectories in the complete trajectory comprises:
   selecting the adjacent local trajectories with the quantity being the same as the quantity of the pictures according to a specified sequence from the fixed quantity of local trajectories in the complete trajectory.

5. The method of claim 1, wherein the determining the display sequence of the acquired pictures comprises:
acquiring corresponding time information and/or geographical information according to the shooting of the acquired pictures;
sequencing the corresponding pictures according to the acquired time information and/or geographical information; and
determining the display sequence of the acquired pictures according to a picture sequencing result.

6. The method of claim 1, further comprising:
generating a moving object;
controlling the moving object to move along the drawn local trajectory; and
displaying a corresponding picture in the display region corresponding to the drawn local trajectory when the moving object moves to a specific position on the drawn local trajectory.

7. The method of claim 6, wherein the controlling the moving object to move along the drawn local trajectory comprises:
acquiring movement time consumption of the moving object, the movement time consumption being acquired by calculating according to preset movement speed and length of the corresponding local trajectory;
determining a coordinate of the moving object along with time variation according to the movement time consumption; and
changing a position of the moving object according to the determined coordinate.

8. A computing device having one or more processors, memory coupled to the one or more processors, and a plurality of programs stored in the memory that, when executed by the one or more processors, cause the computing device to perform the following operations:
acquiring a plurality of pictures;
determining a display sequence of the acquired pictures according to time information and/or geographical information associated with shooting of the acquired pictures;
determining a corresponding local trajectory of each acquired picture in a complete trajectory according to the time information and/or geographical information associated with the shooting of the acquired picture in the display sequence;
drawing corresponding local trajectories in turn according to the display sequence; and
displaying a corresponding acquired picture in a display region adjacent each drawn local trajectory, further including:
moving the display region including the acquired picture continuously along a corresponding transitional trajectory in the complete trajectory; and
replacing the acquired picture with a second acquired picture displayed adjacent a subsequent local trajectory when the local trajectory transits to the subsequent local trajectory according to the display sequence, the drawing the corresponding local trajectories in turn according to the display sequence comprises:
acquiring a trajectory point sequence passed by each determined local trajectory;
acquiring a control point sequence corresponding to the trajectory point sequence; and
drawing a multi-order Bezier curve according to the corresponding trajectory point sequence and control point sequence of corresponding local trajectories in turn in accordance with the display sequence, so as to obtain a corresponding local trajectory, and where the multi-order Bezier curve is a three-order Bezier curve; in the trajectory point sequence, every three trajectory points form a three-order Bezier curve according to a sequence; and the drawn three-order Bezier curves adjoin in sequence, and control points corresponding to the trajectory point at an adjoining part are centrally symmetric about the trajectory point at the adjoining part.

9. The computing device of claim 8, wherein the quantity of the local trajectories in the complete trajectory is fixed; and the local trajectories in the complete trajectory are located at fixed positions in the complete trajectory.

10. The computing device of claim 8, wherein the determining the corresponding local trajectory of each acquired picture in the complete trajectory according to the display sequence comprises:
selecting adjacent local trajectories with quantity being the same as the quantity of the pictures from a fixed quantity of local trajectories in the complete trajectory; and
associating the pictures to the selected local trajectories one to one according to the display sequence.

11. The computing device of claim 8, wherein the determining the display sequence of the acquired pictures comprises:
acquiring corresponding time information and/or geographical information according to the shooting of the acquired pictures;
sequencing the corresponding pictures according to the acquired time information and/or geographical information; and
determining the display sequence of the acquired pictures according to a picture sequencing result.

12. The computing device of claim 8, wherein the drawing the corresponding local trajectories in turn according to the display sequence comprises:
acquiring a trajectory point sequence passed by each determined local trajectory;
acquiring a control point sequence corresponding to the trajectory point sequence; and
drawing a multi-order Bezier curve according to the corresponding trajectory point sequence and control point sequence of corresponding local trajectories in turn in accordance with the display sequence, so as to obtain a corresponding local trajectory.

13. The computing device of claim 8, wherein the operations further comprise:
generating a moving object;
controlling the moving object to move along the drawn local trajectory; and
displaying a corresponding picture in the display region corresponding to the drawn local trajectory when the moving object moves to a specific position on the drawn local trajectory.

14. A non-transitory computer readable storage medium storing a plurality of programs in connection with a computing device having one or more processors, wherein the plurality of programs, when executed by the one or more processors, cause the computing device to perform the following operations:
acquiring a plurality of pictures;

determining a display sequence of the acquired pictures according to time information and/or geographical information associated with shooting of the acquired pictures;

determining a corresponding local trajectory of each acquired picture in a complete trajectory according to the time information and/or geographical information associated with the shooting of the acquired picture in the display sequence;

drawing corresponding local trajectories in turn according to the display sequence; and displaying a corresponding acquired picture in a display region adjacent each drawn local trajectory, further including:

moving the display region including the acquired picture continuously along a corresponding transitional trajectory in the complete trajectory; and replacing the acquired picture with a second acquired picture displayed adjacent a subsequent local trajectory when the local trajectory transits to the subsequent local trajectory according to the display sequence, the drawing the corresponding local trajectories in turn according to the display sequence comprises:

acquiring a trajectory point sequence passed by each determined local trajectory;

acquiring a control point sequence corresponding to the trajectory point sequence; and drawing a multi-order Bezier curve according to the corresponding trajectory point sequence and control point sequence of corresponding local trajectories in turn in accordance with the display sequence, so as to obtain a corresponding local trajectory, and where the multi-order Bezier curve is a three-order Bezier curve; in the trajectory point sequence, every three trajectory points form a three-order Bezier curve according to a sequence; and the drawn three-order Bezier curves adjoin in sequence, and control points corresponding to the trajectory point at an adjoining part are centrally symmetric about the trajectory point at the adjoining part.

15. The non-transitory computer readable storage medium of claim 14, wherein the quantity of the local trajectories in the complete trajectory is fixed; and the local trajectories in the complete trajectory are located at fixed positions in the complete trajectory.

16. The non-transitory computer readable storage medium of claim 14, wherein the determining the corresponding local trajectory of each acquired picture in the complete trajectory according to the display sequence comprises:

selecting adjacent local trajectories with quantity being the same as the quantity of the pictures from a fixed quantity of local trajectories in the complete trajectory; and associating the pictures to the selected local trajectories one to one according to the display sequence.

17. The non-transitory computer readable storage medium of claim 14, wherein the determining the display sequence of the acquired pictures comprises:

acquiring corresponding time information and/or geographical information according to the shooting of the acquired pictures;

sequencing the corresponding pictures according to the acquired time information and/or geographical information; and determining the display sequence of the acquired pictures according to a picture sequencing result.

18. The non-transitory computer readable storage medium of claim 14, wherein the operations further comprise:

generating a moving object;

controlling the moving object to move along the drawn local trajectory; and displaying a corresponding picture in the display region corresponding to the drawn local trajectory when the moving object moves to a specific position on the drawn local trajectory.

\* \* \* \* \*